April 7, 1925. 1,532,396
J. R. GAMMETER ET AL
VALVE MECHANISM
Filed Sept. 19, 1923 4 Sheets-Sheet 2
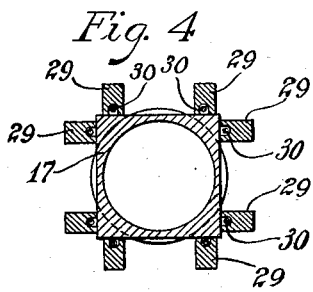
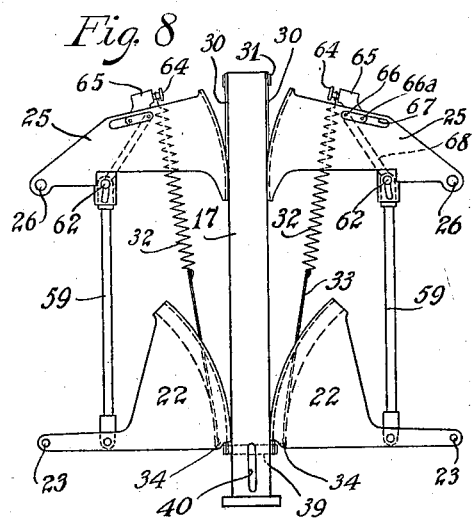
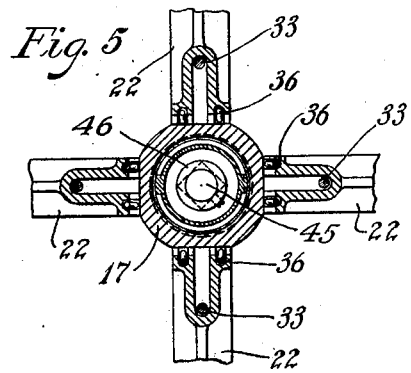
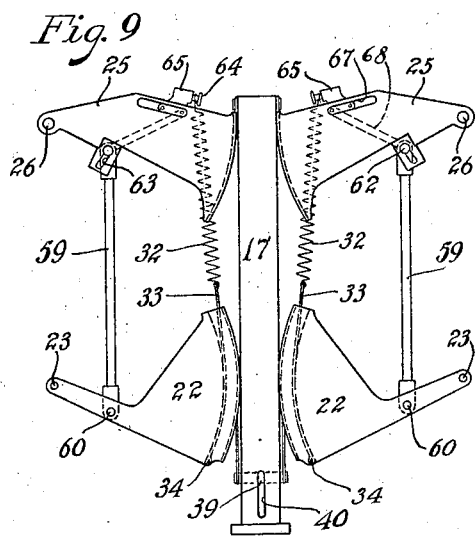
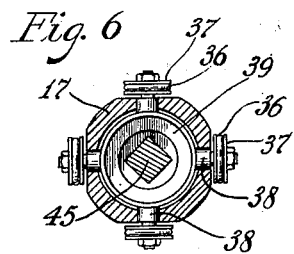
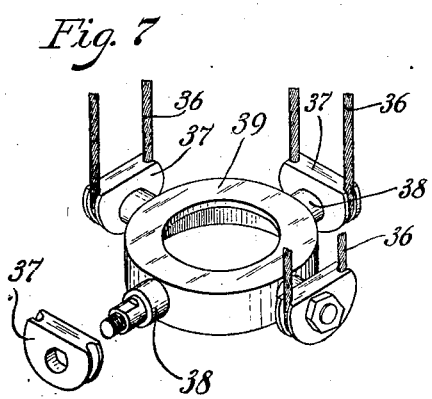
Inventors
John R. Gammeter.
Waldemar D. Kmentt.
By Robert M Pierson
Atty.

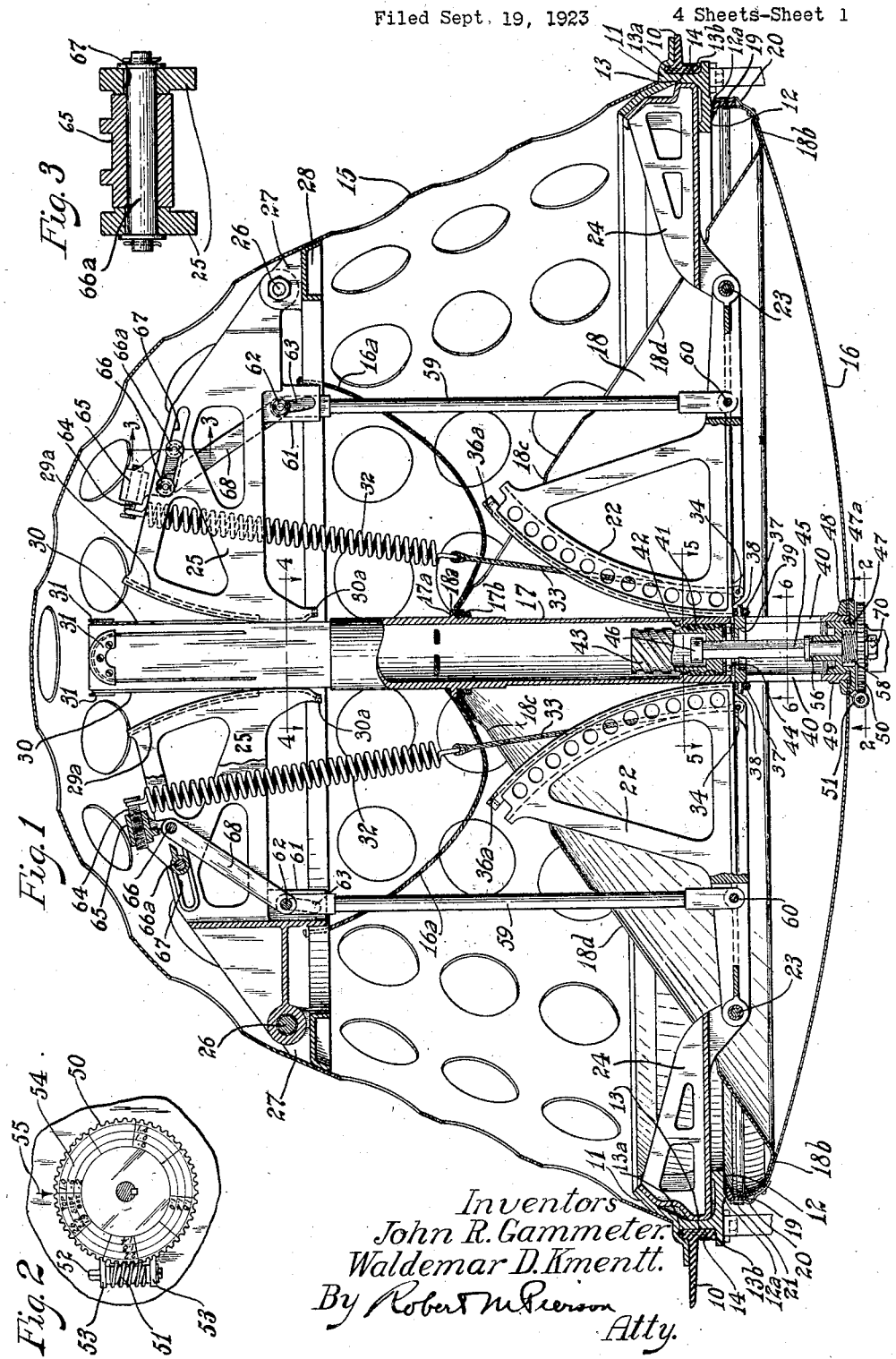

April 7, 1925.　　　　　　　　　　　　　　　　　　1,532,396
J. R. GAMMETER ET AL
VALVE MECHANISM
Filed Sept. 19, 1923　　　4 Sheets-Sheet 3
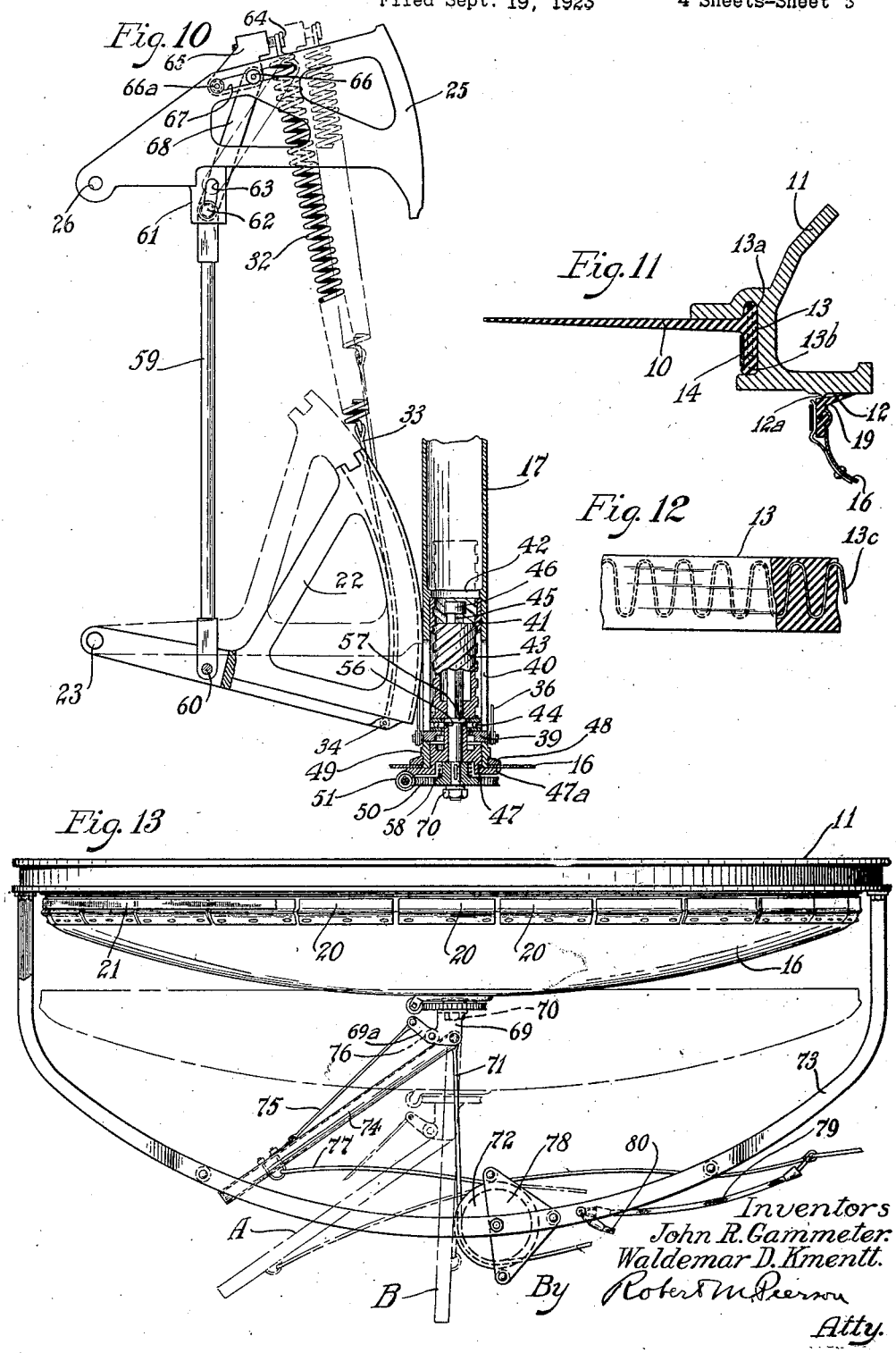

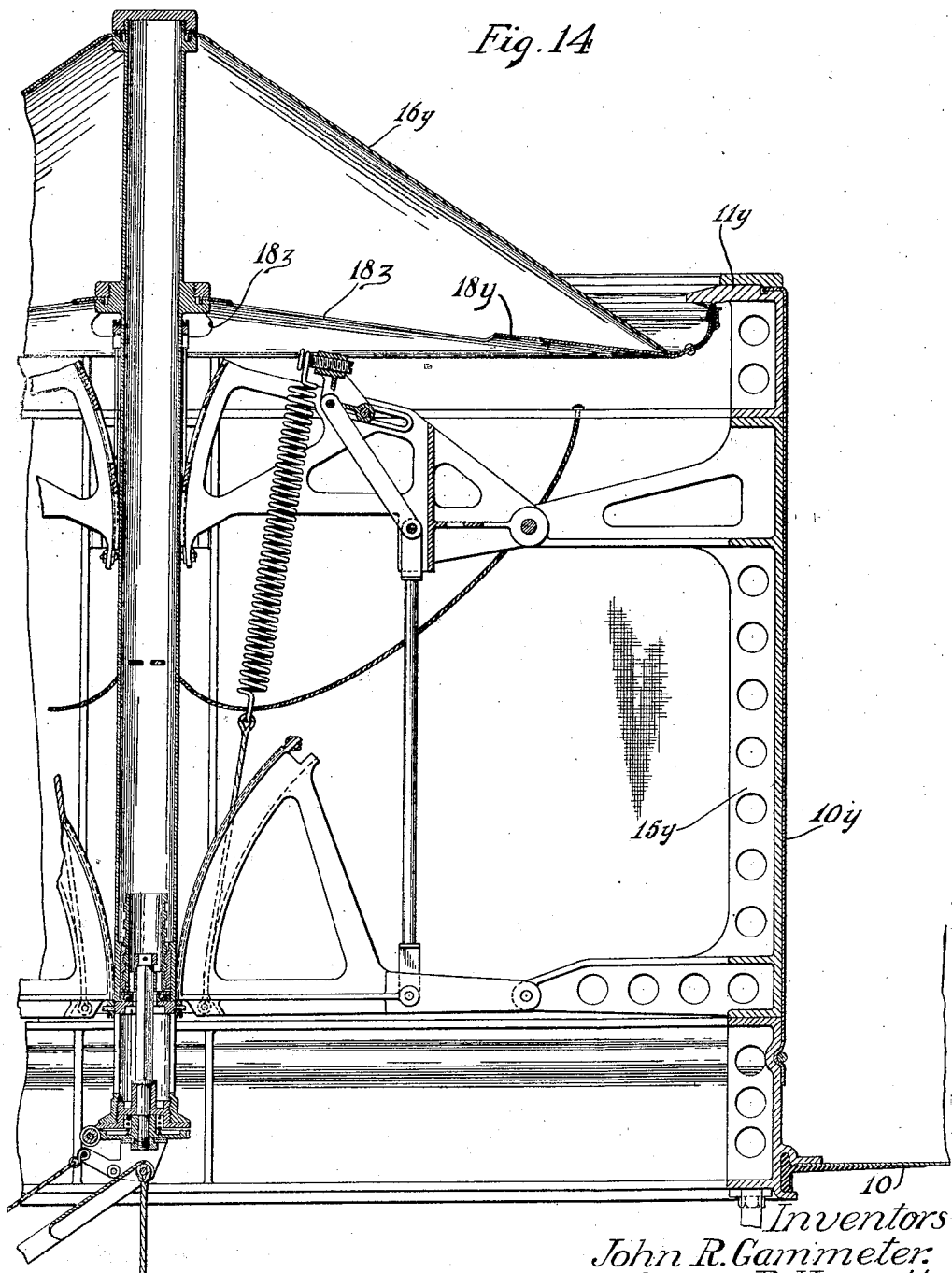

Patented Apr. 7, 1925.

1,532,396

UNITED STATES PATENT OFFICE.

JOHN R. GAMMETER AND WALDEMAR D. KMENTT, OF AKRON, OHIO, ASSIGNORS TO THE B. F. GOODRICH COMPANY, OF NEW YORK, N. Y., A CORPORATION OF NEW YORK.

VALVE MECHANISM.

Application filed September 19, 1923. Serial No. 663,602.

*To all whom it may concern:*

Be it known that we, JOHN R. GAMMETER and WALDEMAR D. KMENTT, citizens of the United States, residing at Akron, in the county of Summit and State of Ohio, have invented a certain new and useful Valve Mechanism, of which the following is a specification.

This invention relates to valves, and finds an important application in large valves of the disc type such as are used in the walls of balloons or the gas bags of dirigible airships to permit escape of gas at the will of the operator or automatically to permit such escape when the preponderance of internal gas pressure as compared with external air pressure reaches or exceeds a determinate amount, as in the case of the balloon rising to high altitudes, or in the case of an increase of gas pressure due to a rise of temperature. While our invention is not wholly limited to installations for the control of gaseous fluids, we have chosen, for purposes of illustration herein, an embodiment thereof suitable for use as a disc-type, relief valve structure for a gas bag.

It is usually desired in valves of this character that the valve and its related mechanism be of such construction that upon being started from the valve seat, by manually applied force or merely by the preponderating gas pressure within the balloon, the valve will continue to open wider, to a full opening, under substantially the same or less force than is required for the initial starting of the valve from its seat, so that the valve will permit a free passage of the escaping fluid, quickly affording a substantial relief of pressure, and then promptly and completely close when the force tending to hold it open has fallen to a determinate value less than that which caused it to open. Such construction obviates the disadvantages of a slow and prolonged escape of gas, in the case of a balloon, and the vibration or chattering of the valve, which may occur in a valve offering an increasing resistance to opening. It is also desirable that the valve be adapted to be set to open at different pressures without unduly affecting the ratio or differential between the opening and closing pressures, and that the valve be adapted to operate dependably and accurately at low as well as high pressures.

Our general object is to provide an improved valve structure of simple construction and accurate and dependable operation. A more specific object is to provide an improved valve structure in which the valve is accurately guided in a wide opening and closing movement without undue change of resistance and without the sliding of one guiding element upon another, thus avoiding excessive friction such as to cause binding or sticking of the valve, and making possible an accurate valve control at low and at high pressures. Another object is to provide for ready and accurate adjustment of a relief valve as to "loading," or the force required to open it, and a further object is to provide a structure in which the loading, of a relief valve having a decreasing resistance to opening, may be varied while preserving, without undue modification, the valve's characteristic of offering a decreasing resistance to opening as it moves away from its seat. Another object is to provide improved external means for accurately indicating the setting or loading of a relief valve. A still further object is to provide a relief valve mechanism in which the actuating mechanism is positioned on the exterior of the valve so as to be readily accessible.

Of the accompanying drawings:

Fig. 1 is a vertical section of a device embodying our invention in a preferred form, the same being mounted as a relief valve in the lower or floor wall of a gas bag, and parts being broken away and sectioned in different planes for clearness of illustration.

Fig. 2 is a section on line 2—2 of Fig. 1, of an adjusting dial-gear and associated parts, as viewed from below.

Fig. 3 is a section on line 3—3 of Fig. 1.

Fig. 4 is a section on line 4—4 of Fig. 1.

Fig. 5 is a section on line 5—5 of Fig. 1.
Fig. 6 is a section on line 6—6 of Fig. 1.
Fig. 7 is a perspective view of a cable-anchoring and adjusting structure.
Fig. 8 is a diagrammatic elevation of a valve-guiding and loading mechanism in valve-closing position.
Fig. 9 is a similar view of the same in valve-opening position.
Fig. 10 is an elevation of a pair of valve guiding arms and associated elements, parts being sectioned, illustrating adjustment of the device to vary the loading of the valve.
Fig. 11 is a vertical section on a large scale showing the attachment of the valve-seat member to the wall of the gas bag and a lip gasket in its relation to the valve and valve seat in closed position.
Fig. 12 is an elevation, with a part in section, of a reinforced border member or bead on the gas bag wall, defining the opening therein for the valve structure.
Fig. 13 is an elevation of the external parts of the valve structure.
Fig. 14 is a vertical section of an alternative embodiment of our invention in which the valve mechanism is on the outer side of the valve so as to be accessible from the exterior of the balloon.

Referring at first to the embodiment shown in Figs. 1 to 13 of the drawings, 10 is the lower wall or floor of a gas bag and 11 is a valve-seating ring formed at its lower side with an annular, generally plane, valve-seating face 12, said ring being so formed in cross-section as to receive with a snug fit an annular, border member or bead 13, formed on the wall of the gas bag and defining the opening therein in which the valve-seating ring is mounted. Said bead, having a substantial width transversely of the gas bag wall, provides an upwardly extending annular flange 13$^a$ fitting within a complemental recess in the ring, and a depending annular flange 13$^b$, which is encircled and held tightly seated against the valve seating ring 11 by a tape 14, which may be of adhesive material such as coated or impregnated fabric and wrapped in superimposed convolutions upon the flange 13$^b$. The bead 13 is provided with a serpentine reinforcing wire 13$^c$ embedded therein, the loops of said wire lying substantially in a cylindrical formation, permitting the bead 13 to be circumferentially elastic, so that it may be stretched and deformed from true cylindrical shape in mounting it upon the valve, said reinforcement at the same time providing local, lateral stiffness in the bead which makes highly effective the anchoring of the bead by its two flanges 13$^a$, 13$^b$.

Secured to the valve-seating ring 11 is a dome-like skeleton frame 15, preferably of perforated sheet metal, as shown, serving as a mounting for certain parts of the valve assembly and as a protective housing for the valve mechanism within the gas bag, being of smooth contour externally so as to support the contacting wall of the gas bag, when the latter is collapsed, out of contact with the valve mechanism and without damage to said wall.

The valve comprises an externally convex, internally concave, disc-type, valve member 16, a central, hollow, guiding stem 17 extending upward into the gas bag therefrom, and a conical, sheet metal brace member 18 having an axial opening at its small end defined by an internal, annular flange 18$^a$ clamped between a shoulder or annular flange 17$^a$ formed on the stem 17 and a nut 17$^b$ screwed upon said stem, the larger annular margin of said brace member being secured to the disc member 16 at 18$^b$, as by welding. The brace member 18 is formed with openings, such as 18$^c$, 18$^d$, therethrough, to accommodate parts of mechanism as shown and as hereinafter described.

The periphery of the disc member 16 is provided with a lip gasket 19, of L shape in cross section, having an internal, transverse flange or lip adapted to seat against the face 12 of the valve-seating ring 11, and the latter is provided with an annular ridge or flange 12$^a$ on said face adapted to receive the relative stiff base portion of the lip gasket and form a seal therewith against the ingress of air in case the pressure within the gas envelope becomes less than the pressure of the atmosphere, as may occur in airships of the rigid dirigible type. The L-shaped lip gasket is formed with an internally beaded, cylindrical, attaching portion, which is clamped against a complemental, marginal face on the exterior of the disc member 16, by a series of segmental spring clips 20, 20, riveted to said disc member and encircled by a winding of adhesive tape 21.

The guiding and loading mechanism for the valve comprises a lower set of segmental valve-guiding levers 22, 22, here shown as four, stepped apart about the valve stem 17, against which their arcuate faces are adapted to bear in rolling contact, said levers being pivoted, on horizontal axes, as at 23, 23, to respective brackets such as 24, 24, secured to and extending radially inward from the valve seating ring 11. In vertical alignment with the several segmental arms 22 of the lower set are segmental, valve-guiding arms such as 25, 25, of an upper set, their arcuate faces likewise being adapted to roll or rock upon the valve stem 17, and their other ends being pivoted on horizontal axes, as at 26, 26, to ears such as 27, 27, formed on an internal reinforcing ring or frame member 28 secured to the dome-like housing 15.

Each of the levers of the upper set is bifurcated from near its pivot to its stem-contacting end, to accommodate a loading spring 32 and adjustment mechanism hereinafter described, each of said levers thus having a rather widely spaced-apart pair of arcuate-faced rockers 29, 29, (Fig. 4) for contacting the valve stem 17, which is squared throughout its upper end portion as shown clearly in Figs. 1 and 4, to provide a flat bearing for the arcuate faces of said widely spaced rockers. The latter may be connected by a brace member 29ª, near their arcuate faces, as shown in Fig. 1, if desired.

Each of said rockers 29 of the upper set of levers is vertically grooved on its arcuate face to accommodate, and to provide an arcuate, laterally-supporting face for, a cable 30 having its ends anchored as at 30ª to said rockers at the lower ends of their arcuate faces and its middle portion looped over and secured by an anchor member 31 secured to the upper end of the stem 17.

Eeach lever 22 of the lower set is formed with a deep medial groove on its arcuate face to accommodate, and to provide an arcuate laterally-supporting face for, an extension cable 33 connected to the loading spring 32, said cable being secured to said lever at 34, at the lower end of said slot. A cable 36, for each lever of the lower set, has its ends anchored to the lever as at 36ª, at the upper ends of the latter's arcuate faces, said faces being grooved to accommodate, and to provide arcuate, laterally-supporting faces for, said cable, and the middle part of the cable 36 is looped about a grooved anchor member 37, the several members 37 being mounted upon respective radial arms 38, 38, projecting from an axially apertured or annular slide 39 mounted within the hollow valve stem 17, said arms being slidably mounted in respective, vertical, guide slots 40 in the wall of said stem. Said slide is provided with adjusting means hereinafter described, for securing it at different positions, longitudinally, in the hollow valve stem 17.

As the loading spring 32 urges toward each other the lower lever 22 and the upper lever 25, to which its ends are respectively connected, thus holding taut the cables 30 and 36, the valve stem 17, and the several upper and lower levers 25 and 22, are compelled to act in determinate relation to each other in moving upward or downward, the arcuate faces of the segmental, valve-guiding levers rolling upon and accurately guiding the valve stem without sliding friction between them.

The loading springs 32 are adapted to urge the valve toward its closed position by reason of the fact that the upper end of each spring is connected to the upper lever 25, at such position thereon that it acts on said lever at a shorter distance from the latter's pivot than it does as regard the lower lever 22, the spring's extension cable 33 being attached to the lower lever at a point relatively remote from its pivot, so that the spring exerts upon the valve stem a greater force upward than it does downward, the levers 22 and 25, although of equal length, constituting a pair of differential levers.

The action perhaps may be more clearly visualized by considering the levers 22 and 25 as opposite elements of a parallel motion, of which the valve stem 17 and the frame connection between the pivots 23 and 26 constitute the alternate or intervening elements, the loading spring 32 constituting an oblique, elastic brace, and elongation of the spring resulting during downward movement of the levers because the spring 32, and the cables 30, 36, acting in opposition thereto, cause the levers to move through equal arcs, so that the lower end of the spring, having a longer moment arm, moves farther than its upper end does.

The effect of decreasing resistance of the valve as it is forced farther open after leaving its valve seat results from the fact that the spring's effective moment arm on the moving, lower, segmental lever is constant, the floor of the groove in said arm which accommodates and laterally supports the extension cable 33 being concentric with the lever's pivot 23, while the upper end of the spring has its anchorage at such high position on the upper lever 25 that as said upper lever descends the spring acts upon said lever through a point of tangency at an increasing effective distance from the lever's pivot 26, within the contemplated limit of downward movement. That is to say, the force of the spring acts upon said lever 25 through the point at which the axis of the spring is nearest the pivot of the lever, which we have above referred to as its point of tangency, and as the lever moves downward such point is farther and farther from said pivot, due to the angular movement of the arm and the spring.

Stop cords 16ª, 16ª, may be provided, as shown, to limit the opening of the valve. The means for adjusting the slide 39 longitudinally of the valve stem 17, to vary the loading of the valve by increasing the spring tension, comprises a nut 41 pressed into the hollow valve stem against an internal flange 42 formed in the latter, and a screw 43 mounted in said nut and adapted, upon being screwed downward in said nut, to force the slide 39 downward, against the force of the loading springs 32, through an interposed, anti-friction, thrust bearing 44, the radial arms 38 of the slide moving in the longitudinal slot 40 in the wall of the valve stem, this adjustment swinging the lower valve-guiding lever 22 away from the upper valve-guiding lever 25 but without changing its point of contact against the valve stem so as to change the length of the parallel-motion element represented by the valve stem.

For conveniently turning the screw 43 from the exterior of the valve, a squared shaft 45 extends through the axial aperture of the slide 39 and slidably fits a square, axial aperture in the base of said screw, the latter being conterbored from its upper end, and 46 is a collar secured upon the end of the squared shaft, within the counterbore of the screw, to limit the upward movement of the screw upon said shaft. The lower end of said shaft is cylindrical and is journaled in and projects downward from a screw plug 47, formed with an axial bearing for said shaft, said plug being mounted in a central opening in the disc member 16 and screwed into the lower end of the valve stem 17. said screw plug is formed with an external, lateral flange 47$^a$, by which the annular margin of the disc member is clamped against a collar 48 fitted upon the stem 17, against a shoulder 49 formed thereon, the central opening of the disc member 10 being thus closed and sealed.

For turning the adjusting shaft 45 and securing it in accurately adjusted positions, a worm gear 50 is secured upon its lower end, on the exterior of the valve, and a worm 51, having a squared trunnion 52 (Fig. 2) to receive a wrench, is journaled, in mesh with said worm gear, in a pair of ears 53, 53, projecting from the flange 47$^a$ of the screw plug 47.

Said gear may be provided with a scale 54 on its lower face, as shown in Fig. 2, associated with an indicator 55, applied to an adjacent part of the disc member 16, for indicating different loadings of the valve. A triple scale is shown in Fig. 2, the outer series of figures, designated "Top," pertaining to the loading of the valve when the latter is mounted in a top wall of the gas bag, where the weight of the movable valve parts is added to the force of the loading springs, while the inner series of figures, designated "Bot," for "bottom," are applicable when the valve is in a lower wall, as in Fig. 1, the weight of the movable parts then acting in opposition to the loading springs, and the middle series of figures, designated "Side," apply when the valve is mounted in a side wall of the gas bag, with the valve stem extending horizontally so that the force of the loading springs is not substantially modified by the weight of valve parts.

To provide a seal of the adjusting shaft's bearing in the screw plug 47, a gasket 56 is interposed between the inner end of said bearing and a flange 57 formed on said shaft, and a compression spring 58, encircling the hub of the worm gear 50, is interposed between said gear and the outer end of the bearing, to hold the gasket 56 compressed between the flange 57 and the bearing.

If the increase of loading of the valve were effected solely by placing the springs 32 under greater tension, as by moving the slide 38 downward in the valve stem, the resistance of the valve (within the range of dimensions most conveniently employed, approximating those shown in the drawings) would, upon opening of the valve, fall off excessively when a high loading of the valve was thus effected,—which is to say that the resistance of the valve at full-open and closed positions, for example, would not have the desired ratio or the desired differential at both the high and the low loadings. The valve when highly loaded might thus permit a substantially greater drop of pressure in the balloon before closing than it would when less heavily loaded. This may be more clearly understood upon consideration of the following:

The springs 32 are of such length and elasticity as approximately to conform, within the limits involved, to the law of elastic bodies that resistance is proportional to distortion. Whatever their initial tension, then, the additional elongation incident to a full opening of the valve will always increase their tension by the same amount, say, for example, 10 pounds in each spring, assuming that its points of attachment are not changed. The spring's moment arm with regard to each valve-guiding lever is the distance from the pivot of the lever to the nearest point on the spring's line of force. Whatever the adjustment for loading and the position of the valve may be, this distance remains constant in the case of the lower lever 22, when constructed, as here shown, with an arcuate cable-supporting face concentric with its pivot, but in the upper lever, 25, this distance increases as the arm descends, as above described. The upward force of the spring upon the stem 17, applied through the lower valve-guiding lever 22, is determined by the ratio of the spring's moment arm (the radius 23—34) to the full length of said valve-guiding lever, which ratio is constant, so that said upward force, both when the valve is opened and when it is closed, and with any contemplated loading adjustment, and with any contemplated direction of pull, may be taken as .9, for example, of the tension of the spring. Let it be assumed that the dimensions, and the spring's point of attachment to the upper lever, 25, are such that in closed position the downward force of the spring upon the stem 17, as applied through the upper valve-guiding lever, is .7 of the tension of the spring, and in open position is .8 of the same, the valve-guiding levers always moving through the same peripheral distance in a full opening of the valve.

Assuming then an initial tension of 20 pounds in the spring, this will be increased to 30 pounds upon full opening of the valve, in accordance with the strength of spring and extent of valve opening assumed above. The net upward spring force exerted upon the valve stem in closed position will then be (.9x20) minus (.7x20), or 4 pounds, and in open position (.9x30) minus (.8x30), or 3 pounds, the valve offering only ¾ as much, or 1 lb. less, resistance when open as when closed. But if the closed-position loading were increased, say to 40 pounds, merely by stretching the spring through turning of the nut 43 as above described, without shifting either of the spring's attachment points, then the full opening of the valve would increase the spring's tension to 50 pounds, and the net upward spring force on the valve stem would be, in closed position, (.9x40) minus (.7x40), or 8 pounds, and in open position (.9x50) minus (.8x50) or 5 pounds, the valve offering only ⅝ as much, or 3 lbs. less, resistance, in open as compared with closed position.

These calculations, based upon arbitrary but valid assumptions, are offered merely to illustrate and clarify the fact that an increase of loading effected merely by placing the loading springs under greater initial tension may result in an excessive falling off of the valve's resistance during the opening of the valve, within the range of dimensions most conveniently used. Thus the valve, when heavily loaded, would permit a greater drop of pressure in the balloon before closing than it would when less heavily loaded. We find that this disadvantage may be obviated and either an approximately constant ratio or an approximately constant differential between open and closing pressure obtained, notwithstanding variations in the loading of the valve, by providing means whereby the increase of loading is in part effected by changing the spring's point of attachment to one of the valve-guiding levers, the effect of such change of attachment point, within certain limits of change, being opposite to the effect of increasing the spring tension, as regards variation of the open-closed pressure differential or ratio. By changing the spring's attachment point on the lever, a wide range of such compensating effects may be obtained and they may be easily calculated in designing the structure.

In the embodiment here shown we have provided means of this character such as to shift the spring's point of attachment on the upper lever as the result of a single adjusting operation effected from the exterior of the valve, which operation at the same time increases the spring tension, so that, with convenient proportion and arrangement of parts, we are enabled to obtain a desirable ratio or differential between opening and closing pressure, and to maintain said ratio or said differential approximately the same for different loadings of the valve.

In providing such adjusting means, the upper and lower valve-guiding levers are preferably pivoted at the same distance from the stem, as here shown, in order that they may constitute opposite elements of a parallel motion, and thus be connected by a link 59, constituting a part of the adjusting device and itself acting as a parallel-motion element. Said link 59 is pivoted to the lower lever 22, at a fixed point 60, and at its upper end is pivoted between a pair of ears, one being shown at 61, formed on the upper valve-guiding lever 25, the pivot pin, 62, being slidably mounted in arcuate slots, such as 63, formed in the respective ears, concentric with the pivot 26 of the valve-guiding lever, this arrangement being such that when the upper and lower valve-guiding levers are adjusted from or toward each other, by turning the worm 51, the pivot pin 62, while sliding in the slots 63, as an incident to such adjustment, will not change its distance from the pivot 26. Thus whatever the position of the pivot pin 62 in the slots 63 may be, the link 59 will act, in the opening and closing movement of the valve, as a parallel-motion arm, and not interfere with the operation of the stem-guiding levers 25 and 22, and the valve stem 17, as respective elements of a parallel-motion.

The upper end of each of the loading springs 32 is hooked upon an adjustable stud bolt 64 screwed into a carriage member 65, the latter having a journal-apertured base portion extending downward between the forks of the bifurcated stem-guiding lever 25 and provided with axle bolts 66, 66ª, projecting through and adapted to run in slots, such as 67, formed in said forks. The axle bolt 66, nearest the valve stem 17, is connected by a link 68 with the top of the parallel-motion link 59, which is thus adapted automatically to move the carriage 65, and the upper end of the loading spring attached thereto, toward the pivot end of the stem-guiding lever 25 when the spring tension is increased by means of the worm 51, and in the opposite direction when the spring tension is by such means decreased. It will be understood that, in the specific construction here shown, such movement of the carriage with relation to the lever 25 does not occur in the opening and closing of the valve, but only during the operation of adjusting the loading of the valve. It will be observed in Figs. 8 and 9 that the pivot pin 62 and the axle bolt 66 at opposite ends of the link 68, do not change their positions with relation to the lever 25 when the valve moves from the closed position of Fig. 8 to the open position of Fig. 9. The shifting of the spring's point of attachment is illustrated in Fig. 10, where the positions of the spring 32, carriage 65, link 68, and lower arm 22 before increase of loading are shown in dot-and-dash lines, and their positions after increase of loading in full lines.

The provision of the adjustable stud bolts as anchorages for the several loading springs provides for ready adjustment of the latter to equalize their net lifting force upon the valve stem, as in case the springs are not all of exactly equal strength or are not all originally mounted under exactly equal tension.

We find that the desired compensating effect is obtained when the relative dimensions and positions of the parts are substantially as shown, but it will be obvious that various effects may be obtained according to the location of the points from which and to which the point of attachment is shifted, which may be widely varied, as by changing the position or direction of the slots 67, or varying the relative length of the link 68, or the form of the carriage 65. In the structure here shown the slots 67 are approximately tangent to a circle drawn about the attachment point 34 of the spring's cable 33, so that movement of the carriage 65 in said slots does not in itself substantially effect the tension of the spring, as this simplifies the problems of calculation in the designing of the structure.

Still broader modifications are possible within the scope of our invention, and we do not wholly limit it to a structure in which the stem-guiding arms are of equal length, nor one in which the point of attachment at one end only of the loading spring is shifted, nor one in which the adjustment of spring tension and shifting of the spring's attachment point are both employed or in which they compensate each other. In fact we consider it one of the important advantages of our invention that it may be variously modified to obtain a wide variety of results, some of which are desirable in a balloon valve while others may be more desirable in other uses.

For manually opening the valve we provide, as shown in Fig. 13, a two armed bracket 69 secured upon the lower end of the shaft 45, against the worm gear 50, by a nut 70, and a valve-opening cable 71 connected to said bracket and running, past a grooved, idler, guide pulley 72 journalled in a frame structure 73 secured to the valve-seating ring 11, to a position within reach of the operator.

For forcibly closing the valve, on occasion, a push rod 74 (Fig. 13) is pivoted between the arms of the bracket 69, and the latter are formed with respective ears or rigid, lateral extensions, one being shown at 69ª, their outer ends being connected by an elastic cord 75 with a remote part of the push rod 74, whereby the latter normally is yieldingly held, against a stop 76, mounted between the arms of the bracket 69, the push rod thus being held out of the way of the cable 71 and pulley 72, so as to assure free opening and closing of the valve. A valve-closing cable 77 has one end secured to the outer end portion of said push rod and runs to the operator's station, past the guide pulley 72, said pulley being formed with respective grooves for the valve opening cable 71 and the valve closing cable 77. A pulley housing or frame 78 is secured to the frame structure 73, to retain said cables in their respective pulley grooves. The operation of the valve-closing cable 77 and the push rod 74 is illustrated by dot-and-dash lines in Fig. 13, where it will be seen that, when the valve is in open position, a pull on the closing cable 77 first swings the push rod from the position A toward a vertical position, B, against the yielding resistance of the elastic cord 75, and as the rod approaches said vertical position the pull of the cable exerts an increasing upward component of force upon said rod and consequently upon the valve. If such component is not sufficient to close the valve, the rod continues to swing toward a vertical position until the pull of the cable thereon is substantially parallel with the rod, the rod then being in vertical position, approximately abutting the pulley, and further pulling of the cable forcibly impels the valve home, the rod moving vertically to position B.

Relatively short elastic cords 79 and 80 connect the frame structure 73 with intermediate parts of the valve closing and valve opening cables respectively, and are adapted to insure a slacking of said cables adjacent the valve when said cables are not being pulled by the operator, so that said cables may not interfere with each other's operation, or the automatic gas pressure operation, of the valve by reason of a binding of the cables between said cords and the operator's station.

It is believed that the operation of the valve, both as to opening and closing under differential gas pressure, as to manual opening and closing, and as to adjustment for different loadings, will be understood from the foregoing, the operation, for clearness, having been described concurrently with the description of structure. It is believed also that many advantages of our invention, including those expressed or implied in the introductory statement of objects, will be obvious without further discussion.

In the alternative embodiment of our invention shown in Fig. 14, the valve controlling mechanism will be recognized as being substantially the same as that shown in Figs. 1 to 13 and above described, except that they are mounted on the exterior of the valve, the disc member, here shown at 16ʸ, being mounted upon the inner instead of the outer end of the valve-grinding stem, and adapted to seat on an annular valve seating member 11ʸ extending inward from a frame or housing structure 15ʸ projecting into the gas bag from the wall thereof. Said frame or housing structure is covered with balloon fabric 10ʸ to afford a sealed closure from the balloon wall proper to the valve seating ring, and the valve-guiding levers are pivoted on the frame structure 15ʸ. The disc member 16ʸ is coned inwardly in its central portion to permit the valve-guiding levers to operate in proximity to the valve seating ring, so as to avoid excessive axial length of valve controlling structure, and a brace member 18ʸ, on the outer side of the disc member and apertured as at 18ᶻ, 18ᶻ, to accommodate the valve-guiding levers, connects the outer periphery of said disc member with the valve-guiding stem. The valve-controlling mechanism, while housed within the frame structure 15ʸ and its covering 10ʸ, are accessible from the exterior of the gas bag without projecting externally from the latter, and the valve and mechanism are protected from the undesirable effects of wind and bad weather.

Various modifications may be resorted to without departing from the scope of our invention, and we do not wholly limit our claims to the specific construction shown.

We claim,

1. A valve mechanism comprising a valve seating member, a valve adapted to seat thereon, a valve impelling lever operatively connecting the two, a spring having connection to said lever for impelling the valve toward its seat, and means on said lever for anchoring the spring at different points thereon such as to vary the spring's moment arm on said lever so as to compensate adjustments of spring tension as to their effect upon the relation between the valve's resistance at closed and open position.

2. A valve mechanism comprising a valve-seating member, a valve adapted to seat thereon, a spring having connection to the two for impelling them toward each other, means for changing the closed-position tension of the spring and additional means whereby the spring's point of attachment to one of its mounting members may be changed.

3. A valve mechanism comprising a valve-seating member, a valve adapted to seat thereon, a spring having connection to the two for impelling them toward each other, means for changing the closed-position tension of the spring and additional means whereby the spring's point of attachment to one of its mounting members may be changed in determinate relation to its change of closed-position tension, the change of tension and the change of attachment point being cumulative in their effect upon the effective force of the spring at closed position but opposed to each other in their effect upon the relation between the spring's effective force at closed and at an open position of the valve.

4. A valve mechanism comprising a valve seating structure, a valve structure adapted to seat thereon, a segmental, valve guiding lever operatively connecting the two, a guide member secured to one of the said structures and adapted to be run upon by the segmental portion of said lever in the opening or closing of the valve, a flexible member secured to said guide member and said lever and adapted to wind upon and be given off from the segmental portion of the latter, and yielding means engaging said lever for impelling said valve structure with relation to its seating structure.

5. A valve mechanism comprising a valve-seating structure, a valve structure adapted to seat thereon, a pivoted, valve-impelling member having an arcuate peripheral portion, said member being interposed operatively between said valve seating structure and said valve structure, a guide member secured to one of the said structures and adapted to be run upon by the arcuate periphery of said valve impelling member in the opening or closing of the valve, means for preventing relative sliding movement between said guide member and said valve-impelling member, and yielding means connected to said valve-impelling member for urging the valve structure and valve seating structure toward each other.

6. A valve mechanism comprising a valve seating structure, a valve adapted to seat thereon, a guiding stem for said valve, a member pivoted on said valve-seating structure and having an arcuate peripheral portion adapted to run on said valve-guiding stem in the opening or closing of the valve, and yielding means engaging said pivoted member for urging the valve toward its seat.

7. A valve mechanism comprising a valve seating member, a valve adapted to seat thereon, a pair of differential levers interposed operatively between the two, and a spring having connection to said differential levers for impelling the valve toward closed position, said connection being such as to give said spring a greater moment arm on one of said levers than on the other.

8. A valve mechanism comprising a valve seating member, a valve adapted to seat thereon, a plurality of pairs of radially disposed, differential levers interposed operatively between the two and located at circumferentially spaced position, so as to act uniformly upon the valve while the latter moves from or toward its seat in parallelism therewith, and yielding means acting upon the levers of each pair for impelling the valve.

9. A valve mechanism comprising a valve seating structure, a valve structure adapted to seat thereon, a pair of differential levers interposed operatively between the two, each of said levers being formed with an arcuate peripheral portion at its end opposite its pivot, a guide member secured to one of the said structures and adapted to be run upon by the arcuate peripheral portions of said levers, means for preventing sliding relative movement between said guide member and said levers, and yielding means acting upon said levers for impelling the valve structure.

10. A valve mechanism comprising a valve seating structure, a valve adapted to seat thereon, a guiding stem for said valve, a pair of differential levers pivoted on said valve-seating structure and having arcuate peripheral portions adapted to roll upon said stem, means for preventing sliding relative movement between said levers and said stem, and yielding means interposed operatively between said differential levers to urge the valve toward closing position.

11. A valve mechanism comprising a valve seating structure, a valve adapted to seat thereon, a guiding stem for said valve, a plurality of levers pivoted on said valve seating structure and having arcuate peripheral portions adapted to run on said stem at approximately the same cross-section thereof to guide the same, said levers being circumferentially spaced about said stem, means for preventing relative sliding movement between said levers and said stem, yielding means engaging said levers for impelling the valve, and means spaced about and engaging said stem in rolling contact at a different cross-section thereof for guiding the same.

12. A valve mechanism comprising a valve seating structure, a valve structure adapted to seat thereon, a set of radially disposed, circumferentially spaced apart levers interposed operatively between the two, and each formed with an arcuate peripheral portion, a guide member secured to one of the said structures and adapted to be run upon by the arcuate peripheral portions of said levers, flexible members so connecting said guide member with the respective levers as to prevent relative sliding movement of the two, said flexible members being adapted to wind upon and be given off from the arcuate peripheral portions of the levers as the latter run upon said guide member, and yielding means acting upon said levers to impel said valve structure.

13. A valve mechanism comprising a valve-seating structure, a valve structure adapted to seat thereon, a plurality of pairs of radially disposed, circumferentially spaced, differential levers interposed operatively between the two and each formed with an arcuate peripheral portion, a guide member secured to one of the said structures and adapted to be run upon by the arcuate portions of said levers, means for preventing relative sliding movement between said guide member and said levers, and yielding means acting differentially upon said levers to impel said valve structure.

14. A valve mechanism comprising a valve-seating structure, a valve structure adapted to seat thereon, a plurality of pairs of radially disposed, circumferentially spaced, differential levers interposed operatively between the two and each formed with an arcuate peripheral portion, a guide member secured to one of the said structures and adapted to be run upon by the arcuate portions of said levers, flexible members so connecting said guide member with the respective levers as to prevent relative sliding movement of the two longitudinally of the guide member, said flexible members being adapted to wind upon and be given off from the arcuate peripheral portions of the levers as the latter run upon said guide member, and yielding means acting upon said levers to impel said valve structure.

15. A valve mechanism comprising a valve-seating structure, a valve adapted to seat thereon, a guiding stem for said valve, a plurality of pairs of radially disposed, circumferentially spaced, differential levers pivoted on said valve-seating structure and each formed with an arcuate peripheral portion adapted to run upon said stem, and a spring differentially connecting the levers of each pair.

16. A valve mechanism comprising a valve-seating structure, a valve adapted to seat thereon, a guiding stem for said valve, a plurality of pairs of differential levers pivoted on said structure and each formed with an arcuate peripheral portion adapted to run upon said stem, flexible members so connecting each of said levers with said stem as to prevent the levers of each pair from moving toward each other, said flexible members being adapted to wind upon and be given off from the arcuate peripheral portions of said levers, as the latter run upon said stem, and a pull spring differentially connecting the levers of each pair.

17. A valve mechanism comprising a valve seating structure, a valve structure adapted to seat thereon, a pair of levers operatively connecting the two, mounted for movement in the same plane and each formed with an arcuate peripheral portion, a guide member secured to one of the said structures and adapted to be run upon by the arcuate portions of said levers in rolling contact, flexible members secured respectively to said levers and running about their arcuate portions and in opposite directions to points of attachment on said guide member, and a spring interposed between said levers and adapted to hold said flexible members taut.

18. A valve mechanism comprising a valve seating structure, a valve adapted to seat thereon, a pair of differential, valve-impelling levers operatively connecting the two, a spring differentially connecting said levers, and manually operable means exterior of the valve for concurrently and in determinate relation varying the tension of said spring and varying its moment arm, for a given position of the valve.

19. A valve mechanism comprising a valve seating structure, a valve adapted to seat thereon, a plurality of circumferentially spaced pairs of differential, valve-impelling levers operatively connecting the two, a spring connecting the levers of each pair, and means for concurrently and in determinate relation varying the tension of said springs and varying their moment arms for a given position of the valve.

20. A valve mechanism comprising a valve seating structure, a valve adapted to seat thereon, a plurality of valve-impelling levers operatively connecting the two, yielding means engaging said levers for impelling said valve, means for varying the moment arm of said yielding means on said levers, and additional means for varying the force of said yielding means.

21. A valve mechanism comprising a valve seating structure, a valve adapted to seat thereon, a plurality of circumferentially spaced pairs of valve-impelling, differential levers operatively connecting the two, springs connecting the levers of each pair, and means for varying the moment arms of the several springs for a given position of the valve.

22. A valve mechanism comprising a valve seating structure, a valve adapted to seat thereon, a plurality of pairs of valve-impelling, differential levers operatively connecting the two, springs connecting the levers of each pair, and means for concurrently and in determinate relation varying the moment arms of the several springs for a given position of the valve.

23. A valve mechanism comprising a valve seating structure, a valve adapted to seat thereon, a plurality of pairs of valve-impelling, differential levers operatively connecting the two, springs connecting the levers of each pair, means for independently varying the moment arms of the several springs, and means for concurrently and in determinate relation varying their moment arms, for a given position of the valve.

24. A valve mechanism comprising a valve seating structure, a valve adapted to seat thereon, a pair of differential, valve impelling levers of equal length operatively connecting the two, said levers constituting opposite elements of a parallel motion in the opening and closing of the valve, a spring anchoring member movably mounted on one of said levers, a spring connecting said anchoring member with the other lever, the spring having a different moment arm on the two levers, and means for concurrently and in determinate relation changing the position of said spring anchoring member on its lever, to change the spring's moment arm thereon for a given valve position, and varying the tension of the spring.

25. A valve mechanism comprising a valve seating structure, a valve adapted to seat thereon, a pair of differential, valve impelling levers of equal length operatively connecting the two, said levers constituting opposite elements of a parallel motion in the opening and closing of the valve, a spring anchoring member movably mounted on one of said levers, a spring connecting said anchoring member with the other lever, the spring having a different moment arm on the two levers, means so connecting the swinging ends of said levers as to hold them in spaced relation against the force of said spring, said means being adapted to hold said levers at different distances from each other without variation of the spacing of its effective points of connection therewith, so that said means may act with said levers as an element of the parallel motion notwithstanding variation in the spacing apart of said levers, a link pivoted to one of said levers at a definite distance from the lever's pivot and having its opposite end constrained to an arc on the other lever, said arc being of a radius equal to said definite distance, and concentric with the latter's pivot, the last mentioned lever being that on which the aforesaid spring anchoring member is movably mounted, and a link connecting the first mentioned link with said spring anchoring member.

26. A valve mechanism comprising a valve seating structure, a valve adapted to seat thereon, valve impelling and guiding members constituting with said valve seating structure a parallel motion, a link connecting opposite elements of said parallel motion and adapted itself to act therewith as one of three parallel motion elements intervening between said opposite elements, the said opposite elements being adapted to be held at different distances apart by one of the said intervening elements, and the intervening parallel motion elements being adapted to function as such notwithstanding such different spacing of said opposite elements, a spring-anchoring member adjustably mounted on one of said opposite elements, a spring connecting said anchoring member with the other of said opposite elements, the spring having different moment arms on said elements, and means connecting said link with said spring anchoring means for automatically adjusting the latter when the spacing of said opposite elements is varied.

27. A valve mechanism comprising a valve seating structure, a valve adapted to seat thereon, a guiding stem for said valve, a pair of segmental levers of equal length pivoted on said structure and adapted to run on said stem, means for preventing relative sliding movement between one of said levers and said stem, a flexible member so connecting the swinging end of the other lever with said stem as to hold it spaced apart from the first lever, said flexible member lying against the segmental face of said lever, a spring-anchoring member adjustably mounted on one of said levers, a spring connecting the same with the other of said levers, the spring having a different moment arm on the respective levers, means for changing the attachment point of said flexible member on said stem to vary the spacing of said levers, and means, actuated by such variation of spacing, for adjusting said spring anchoring member on its lever.

28. A valve mechanism comprising a valve-seating structure, a valve adapted to seat thereon, a guiding stem for said valve, a pair of differential, valve impelling levers pivoted on said valve seating structure and formed with arcuate peripheral portions adapted to run on said stem, a spring differentially connecting said levers, and means for preventing sliding movement of said levers longitudinally on said stem, the last said means, as to one of said levers, being adjustable longitudinally of said stem to vary the spacing apart of said levers.

29. A valve mechanism comprising a valve-seating structure, a valve adapted to seat thereon, a guiding stem for said valve, a plurality of pairs of circumferentially spaced apart, differential, valve-impelling levers pivoted on said valve-seating structure and formed with arcuate peripheral portions adapted to roll on said stem, springs differentially connecting the levers of each pair, and means for preventing sliding movement of said levers longitudinally of said stem, the last said means, as to one lever of each pair, being adjustable longitudinally of said stem concurrently to vary the spacing apart of the levers of the several pairs.

30. A valve mechanism comprising a valve seating structure, a valve adapted to seat thereon, a hollow guiding stem for said valve, guiding means mounted on said valve seating structure and engaging said stem for guiding the valve, a set of circumferentially spaced apart valve-closing springs operatively connecting said valve-seating structure and said valve, a slide mounted within said hollow stem and having portions projecting through longitudinal slots in the wall thereof, said portions having connection to said springs, and means extending from said slide, axially of said stem, to the outer end thereof, for adjusting said slide longitudinally of said stem to vary the effective force of said springs.

31. A valve mechanism comprising a valve-seating structure, a valve adapted to seat thereon, an axial guiding stem for said valve, a set of valve-closing springs operatively connecting said valve seating structure with said valve, an axial shaft journaled in said stem and extending to the outer end thereof, means at an intermediate part of the stem, actuated by said shaft, for varying the effective force of said springs, a worm wheel secured on said shaft at the outer end of the stem, and a worm journaled adjacent and meshed with said worm wheel.

32. A valve mechanism comprising a valve-seating structure, a valve adapted to seat thereon, valve-loading mechanism including a spring, means for varying the loading of the valve by concurrently varying the tension of the spring and its moment arm, a worm gear on the exterior of the valve for adjusting said valve loading mechanism and locking it in adjustment, and a scale and an indicator adapted to register angular movement of said worm gear.

33. A valve mechanism comprising a valve-seating member, a valve adapted to seat thereon, a valve loading mechanism, and an indicator and a scale associated therewith adapted to register the loading of the valve in different positions affecting the loading of the valve due to the weight of valve parts.

34. A valve mechanism comprising a valve, a valve seating member therefor, a walled valve-mechanism-housing sealed to said valve-seating member and extending therefrom in the direction of said disc member's opening movement, and controlling mechanism for said valve contained within said housing.

35. In combination with a gas container for air craft, a valve mechanism comprising an inturned, annular extension of the wall of said container constituting a valve-mechanism housing, an annular valve seating member sealed to an inner portion of said extension, a valve adapted to seat on said member, and control mechanism for said valve operatively connecting said valve seating member and said valve and located in said housing.

36. In combination with a gas container for aircraft, a valve mechanism comprising a valve seating member mounted in the wall of said container, a valve adapted to seat thereon, a valve impelling lever operatively connecting the two, a spring having connection to said lever for impelling the valve toward its seat, and means on said lever for anchoring the spring at different points thereon such as to vary the spring's moment arm on said lever.

In witness whereof we have hereunto set our hands this 11th day of September, 1923.

JOHN R. GAMMETER.
WALDEMAR D. KMENTT.